(12) United States Patent
Metsala et al.

(10) Patent No.: US 11,984,968 B2
(45) Date of Patent: May 14, 2024

(54) CENTRALIZED NETWORK DEVICE CHANGE PROCEDURE

(71) Applicant: NOKIA TECHNOLOGIES OY, Espoo (FI)

(72) Inventors: Esa Metsala, Espoo (FI); Esa Malkamaki, Espoo (FI); Xiang Xu, Jiangsu (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 138 days.

(21) Appl. No.: 17/310,598

(22) PCT Filed: Feb. 12, 2019

(86) PCT No.: PCT/CN2019/074859
§ 371 (c)(1),
(2) Date: Aug. 12, 2021

(87) PCT Pub. No.: WO2020/163993
PCT Pub. Date: Aug. 20, 2020

(65) Prior Publication Data
US 2022/0109497 A1   Apr. 7, 2022

(51) Int. Cl.
*H04B 7/185* (2006.01)
*H04W 36/00* (2009.01)
*H04W 88/08* (2009.01)

(52) U.S. Cl.
CPC .... *H04B 7/18573* (2013.01); *H04W 36/0011* (2013.01); *H04W 88/085* (2013.01)

(58) Field of Classification Search
CPC ............. H04B 7/1853; H04B 7/18573; H04W 36/0011; H04W 88/085
See application file for complete search history.

(56) References Cited

U.S. PATENT DOCUMENTS

| 10,187,860 B2* | 1/2019 | Keskitalo ............ H04W 56/001 |
| 2016/0066255 A1* | 3/2016 | Marinier ............ H04W 56/001 370/350 |

(Continued)

FOREIGN PATENT DOCUMENTS

| CN | 108924886 A | 11/2018 |
| CN | 109151871 A | 1/2019 |
| CN | 109246747 B | 9/2021 |

OTHER PUBLICATIONS

European Search Report for Application No. 19915330.5, dated Oct. 4, 2022, 12 pages.

(Continued)

*Primary Examiner* — Liton Miah
(74) *Attorney, Agent, or Firm* — LIPPES MATHIAS LLP

(57) ABSTRACT

Embodiments of the present disclosure relate to a centralized network device change procedure. A method comprises in response to a distributed network device being to be disconnected with a centralized network device and connected with a further centralized network device, transmitting an interface resuming request from a distributed network device to the further centralized network device, the interface resuming request being used for resuming an inactivated interface between the further centralized network device and the distributed network device, the terminal device is served by the centralized network device via the distributed network device; and in response to receiving, from the further centralized network device, a resuming status message indicating the interface is successfully resumed, activating the inactivated interface to complete the resume procedure. In this way, when a gNB-DU, which is located at the satellite and moves along with the satellite, moves from the coverage of a gNB-CU to the coverage of a new gNB-CU, a terminal device, which is served by a gNB-CU via a gNB-DU, will keep the connection with the (Continued)

gNB-CU, such that the connectivity of the accessed terminal device will be maintained and meanwhile the signalling overhead for interface configuration will be saved.

16 Claims, 7 Drawing Sheets

(56) References Cited

U.S. PATENT DOCUMENTS

| | | | |
|---|---|---|---|
| 2016/0135247 A1* | 5/2016 | Ozturk | H04W 36/0094 455/436 |
| 2016/0226574 A1 | 8/2016 | Lamarca et al. | |
| 2018/0332561 A1* | 11/2018 | Da Silva | H04W 76/27 |
| 2018/0376380 A1 | 12/2018 | Leroux | |
| 2019/0313244 A1* | 10/2019 | Wang | H04W 8/24 |
| 2021/0144793 A1* | 5/2021 | Kim | H04W 76/18 |

OTHER PUBLICATIONS

3GPP TSG-RAN WG3 Meeting #102, Spokane, US; R3-186694; "Mobility Issues in NTN"; Source: Huawei; Agenda Item: 20.2.4.1; Nov. 12-16, 2018; 3 pages.

3GPP TSG-RAN WG3 RAN3-AH-1807, R3-184259; "Cell Activation/Deactivation Over M-Plane"; Agenda Item: 31.3.1.8; Source: NTT Docomo, Inc.; Montreal, Canada; Jul. 2-6, 2018, 4 pages.

3GPP TSG-RAN WG2 Meeting #103bis, R2-1813947; "Discussion on the Mobility of Non Terrestrial Network"; Source: ZTE Corporation, Sanechips; Agenda Item: 11.6; Chengdu, China; Oct. 8-12, 2018; 8 pages.

Office Action for Chinese Application No. 201980091870.5, dated Oct. 14, 2022, 8 pages.

International Search Report and Written Opinion for International Application No. PCT/CN2019/074859, dated Oct. 29, 2019, 7 pages.

3GPP TR 38.821, V0.3.0, "3rd Generation Partnership Project; Technical Specification Group Radio Access Network; Solutions for NR to support non-terrestrial networks (NTN) (Release 16)", Nov. 2018; 34 pages.

3GPP TSG RAN TR 38.816, V15.0.0; "3rd Generation Partnership Project; Technical Specification Group Radio Access Network; Study on CU-DU lower layer split for NR; (Release 15)", Dec. 2017, 16 pages.

* cited by examiner

CENTRALIZED NETWORK DEVICE CHANGE PROCEDURE

CROSS-REFERENCE TO RELATED APPLICATIONS

This application is a national stage entry of International Application No. PCT/CN2019/074859, filed Feb. 12, 2019, entitled "CENTRALIZED NETWORK DEVICE CHANGE PROCEDURE" which is hereby incorporated by reference in its entirety.

FIELD

Embodiments of the present disclosure generally relate to the field of telecommunication and in particular, to a centralized network device change procedure.

BACKGROUND

In a 3rd Generation Partner Project (3GPP), TR 38.811 and TR38.821 is proposed to support non-terrestrial networks (NTN). One of the architectures for the NTN is deploy a Centralized Unit-Distributed Unit (CU-DU) high layer split, such that the gNB-DU is located in the satellite while the gNB-CU is on the ground. The same CU-DU split architecture is also under study in the Integrated Access and Backhaul (IAB) 3GPP study item as one architecture option. Compared to CU-DU split architecture specified in the traditional terrestrial network, in NTN, the DU is located in a satellite which should be in a moving state all the time. However, in the basic IAB case under study, as well as in other regular cases, the DU is not moving. A logical interface F1 is supported between the gNB-DU and the gNB-CU, through which the gNB-DU communicate with the gNB-CU. For NTN, when the gNB-DU (i.e. a satellite) moves from the area served by one gNB-CU (i.e. a Ground station, (GS)) to another gNB-CU, the gNB-DU may be connected to the new gNB-CU via the F1 interface.

In this centralized network device change procedure, as a conventional way, the configuration including all set-up parameters should be transmitted to a new gNB-CU to be accessed, which may cause a complicated centralized network device change procedure and the service provided to the UEs may be broken.

SUMMARY

In general, example embodiments of the present disclosure provide a solution for a centralized network device change procedure in non-terrestrial networks.

In a first aspect, there is provided a method for a centralized network device change procedure in non-terrestrial networks. The method comprises in response to a distributed network device being to be disconnected with a centralized network device and connected with a further centralized network device, transmitting an interface resuming request from the distributed network device to the further centralized network device, the interface resuming request being used for resuming an inactivated interface between the further centralized network device and the distributed network device; and in response to receiving, from the further centralized network device, a resuming status message indicating the interface is successfully resumed, activating the inactivated interface to complete the resume procedure.

In a second aspect, there is provided a method for a centralized network device change procedure in non-terrestrial networks. The method comprises in response to a distributed network device being to be disconnected with a centralized network device and connected with a further centralized network device, receiving, at the further centralized network device, an interface resuming request from the distributed network device, the interface resuming request being used for resuming inactivated interface between the further centralized network device and the distributed network device and being transmitted by the distributed network device; determining, based on the interface resuming request, whether configuration parameters of the inactivated interface exist at the further centralized network device; and in response to determining that the configuration parameters exist at the further centralized network device, transmitting, to the distributed network device, a resuming status message indicating the inactivated interface is successfully resumed.

In a third aspect, there is provided a method for a centralized network device change procedure in non-terrestrial networks. The method comprises in response to a distributed network device being to be disconnected with a centralized network device and connected with a further centralized network device and an inactivated interface between the further centralized network device and the distributed network device being to be resumed, receiving, at a centralized network device, an interface suspending request from the distributed network device, the interface suspending request being used for suspending an activated interface between the distributed network device and the centralized network device; generating, based on the interface suspending request, a suspending confirmation message indicating the interface is ready to be suspended; and transmitting the suspending confirmation message to the distributed network device.

In a fourth aspect, there is provided a method for a centralized network device change procedure in non-terrestrial networks. The method comprises in response to a distributed network device being to be disconnected with a centralized network device and a further distributed network device being to be connected with a further centralized network device and an inactivated interface between the further centralized network device and the further distributed network device being successfully resumed, transmitting an interface suspending request to the centralized network device from the distributed network device having an activated interface with the centralized network device, the interface suspending request being used for suspending the activated interface; and in response to receiving, from the centralized network device, a suspending confirmation message indicating the activated interface is ready to be suspended, suspending the activated interface, the suspending confirmation message being generated by the centralized network device based on the interface suspending request.

In a fifth aspect, there is provided a method for a centralized network device change procedure in non-terrestrial networks. The method comprises in response to a distributed network device being to be disconnected with a centralized network device and a further distributed network device being to be connected with a further centralized network device and an inactivated interface between the further centralized network device and the further distributed network device being successfully resumed, receiving, at the centralized network device, an interface suspending request from the distributed network device having an activated interface with the centralized network device, the interface suspending request being used for suspending the activated interface and being transmitted by the distributed network device; generating, based on the interface suspending request, a suspending confirmation message indicating the activated interface is ready to be suspended; and transmitting the suspending confirmation message to the distributed network device.

In a sixth aspect, there is provided a method for a centralized network device change procedure in non-terrestrial networks. The method comprises in response to a distributed network device being to be disconnected with a centralized network device and a further distributed network device being to be connected with a further centralized network device, transmitting an interface resuming request from the further distributed network device to the further centralized network device, the interface resuming request being used for resuming an inactivated interface between the further centralized network device and the further distributed network device; and in response to receiving, from the further centralized network device, a resuming status message indicating the inactivated interface is successfully resumed, activating the inactivated interface to complete the resume procedure.

In a seventh aspect, there is provided a method for a centralized network device change procedure in non-terrestrial networks. The method comprises in response to a distributed network device being to be disconnected with a centralized network device and a further distributed network device being to be connected with a further centralized network device, receiving, at the further centralized network device, an interface resuming request from the further distributed network device, the interface resuming request being used for resuming an inactivated interface between the further centralized network device and the further distributed network device; determining, based on the interface resuming request, whether configuration parameters of the inactivated interface exist at the centralized network device; and in response to determining that the configuration parameters exist at the centralized network device, transmitting, to the further distributed network device, a resuming status message indicating the interface is successfully resumed.

In an eighth aspect, there is provided a device for a centralized network device change procedure in non-terrestrial networks. The device comprises at least one processor; and at least one memory including computer program codes; the at least one memory and the computer program codes are configured to, with the at least one processor, cause the device at least to in response to a distributed network device being to be disconnected with a centralized network device and connected with a further centralized network device, transmit an interface resuming request from the distributed network device to the further centralized network device, the interface resuming request being used for resuming an inactivated interface between the further centralized network device and the distributed network device; and in response to receiving, from the further centralized network device, a resuming status message indicating the interface is successfully resumed, activate the inactivated interface to complete the resume procedure.

In a ninth aspect, there is provided a device for a centralized network device change procedure in non-terrestrial networks. The device comprises at least one processor; and at least one memory including computer program codes; the at least one memory and the computer program codes are configured to, with the at least one processor, cause the device at least to in response to a distributed network device being to be disconnected with a centralized network device and connected with a further centralized network device, receive, at the further centralized network device, an interface resuming request from the distributed network device, the interface resuming request being used for resuming inactivated interface between the further centralized network device and the distributed network device and being transmitted by the distributed network device; determine, based on the interface resuming request, whether configuration parameters of the inactivated interface exist at the further centralized network device; and in response to determining that the configuration parameters exist at the further centralized network device, transmit, to the distributed network device, a resuming status message indicating the inactivated interface is successfully resumed.

In a tenth aspect, there is provided a device for a centralized network device change procedure in non-terrestrial networks. The device comprises at least one processor; and at least one memory including computer program codes; the at least one memory and the computer program codes are configured to, with the at least one processor, cause the device at least to in response to a distributed network device being to be disconnected with a centralized network device and connected with a further centralized network device and an inactivated interface between the further centralized network device and the distributed network device being to be resumed, receive, at the centralized network device, an interface suspending request from the distributed network device, the interface suspending request being used for suspending an activated interface between the distributed network device and the centralized network device; generate, based on the interface suspending request, a suspending confirmation message indicating the interface is ready to be suspended; and transmit the suspending confirmation message to the distributed network device.

In an eleventh aspect, there is provided a device for a centralized network device change procedure in non-terrestrial networks. The device comprises at least one processor; and at least one memory including computer program codes; the at least one memory and the computer program codes are configured to, with the at least one processor, cause the device at least to in response to a distributed network device being to be disconnected with a centralized network device and a further distributed network device being to be connected with a further centralized network device and an inactivated interface between the further centralized network device and the distributed network device being successfully resumed, transmit an interface suspending request to the centralized network device from a distributed network device having an activated interface with the centralized network device, the interface suspending request being used for suspending the activated interface; and in response to receiving, from the centralized network device, a suspending confirmation message indicating the activated interface is ready to be suspended, suspend the activated interface, the suspending confirmation message being generated by the centralized network device based on the interface suspending request.

In a twelfth aspect, there is provided a device for a centralized network device change procedure in non-terrestrial networks. The device comprises at least one processor; and at least one memory including computer program codes; the at least one memory and the computer program codes are configured to, with the at least one processor, cause the device at least to in response to a distributed network device being to be disconnected with a centralized network device and a further distributed network device being to be connected with a further centralized network device and an inactivated interface between the further centralized network device and the further distributed network device being successfully resumed, receive, at the centralized network device, an interface suspending request from the distributed network device, the interface suspending request being used for suspending an activated interface between the distributed network device and the centralized network device; generate, based on the interface suspending request, a suspending confirmation message indicating the interface is ready to be suspended; and transmit the suspending confirmation message to the distributed network device.

In a thirteenth aspect, there is provided a device for a centralized network device change procedure in non-terrestrial networks. The device comprises at least one processor; and at least one memory including computer program codes; the at least one memory and the computer program codes are configured to, with the at least one processor, cause the device at least to in response to a distributed network device being to be disconnected with a centralized network device and a further distributed network device being to be connected with a further centralized network device, transmit an interface resuming request from the further distributed network device to the further centralized network device, the interface resuming request being used for resuming an inactivated interface between the further centralized network device and the further distributed network device; and in response to receiving, from the further centralized network device, a resuming status message indicating the inactivated interface is successfully resumed, activate the inactivated interface to complete the resume procedure.

In a fourteenth aspect, there is provided a device for a centralized network device change procedure in non-terrestrial networks. The device comprises at least one processor; and at least one memory including computer program codes; the at least one memory and the computer program codes are configured to, with the at least one processor, cause the device at least to in response to a distributed network device being to be disconnected with a centralized network device and a further distributed network device being to be connected with a further centralized network device, receive, at the further centralized network device, an interface resuming request from the further distributed network device, the interface resuming request being used for resuming an inactivated interface between the further centralized network device and the further distributed network device; determine, based on the interface resuming request, whether configuration parameters of the inactivated interface exist at the centralized network device; and in response to determining that the configuration parameters exist at the centralized network device, transmit, to the further distributed network device, a resuming status message indicating the interface is successfully resumed.

In a fifteenth aspect, there is provided an apparatus comprising means to perform the steps of the method according to the first aspect. The apparatus comprises means for in response to a distributed network device being to be disconnected with a centralized network device and connected with a further centralized network device, transmitting an interface resuming request from the distributed network device to the further centralized network device, the interface resuming request being used for resuming an inactivated interface between the further centralized network device and the distributed network device; and means for in response to receiving, from the further centralized network device, a resuming status message indicating the interface is successfully resumed, activating the inactivated interface to complete the resume procedure.

In a sixteenth aspect, there is provided an apparatus comprising means to perform the steps of the method according to the second aspect. The apparatus comprises means for in response to a distributed network device being to be disconnected with a centralized network device and connected with a further centralized network device, receiving, at the further centralized network device, an interface resuming request from the distributed network device, the interface resuming request being used for resuming inactivated interface between the further centralized network device and the distributed network device and being transmitted by the distributed network device; means for determining, based on the interface resuming request, whether configuration parameters of the inactivated interface exist at the further centralized network device; and means for in response to determining that the configuration parameters exist at the further centralized network device, transmitting, to the distributed network device, a resuming status message indicating the inactivated interface is successfully resumed.

In a seventeenth aspect, there is provided an apparatus comprising means to perform the steps of the method according to the third aspect. The apparatus comprises means for in response to a distributed network device being to be disconnected with a centralized network device and connected with a further centralized network device and an inactivated interface between the further centralized network device and the distributed network device being to be resumed, receiving, at the centralized network device, an interface suspending request from the distributed network device, the interface suspending request being used for suspending an activated interface between the distributed network device and the centralized network device; means for generating, based on the interface suspending request, a suspending confirmation message indicating the interface is ready to be suspended; and means for transmitting the suspending confirmation message to the distributed network device.

In a eighteenth aspect, there is provided an apparatus comprising means to perform the steps of the method according to the fourth aspect. The apparatus comprises means for in response to a distributed network device being to be disconnected with a centralized network device and a further distributed network device being to be connected with a further centralized network device and an inactivated interface between the further centralized network device and the distributed network device being successfully resumed, transmitting an interface suspending request to the centralized network device from a distributed network device having an activated interface with the centralized network device, the interface suspending request being used for suspending the activated interface; and means for in response to receiving, from the further centralized network device, a resuming status message indicating the interface is successfully resumed, activating the inactivated interface to complete the resume procedure.

In a nineteenth aspect, there is provided an apparatus comprising means to perform the steps of the method according to the fifth aspect. The apparatus comprises means for in response to a distributed network device being to be disconnected with a centralized network device and a further distributed network device being to be connected with a further centralized network device and an inactivated interface between the further centralized network device and the further distributed network device being successfully resumed, receiving, at a centralized network device, an interface suspending request from a distributed network device having an activated interface with the centralized network device, the interface suspending request being used for suspending the activated interface and being transmitted by the distributed network device; means for generating, based on the interface suspending request, a suspending confirmation message indicating the activated interface is ready to be suspended; and means for transmitting the suspending confirmation message to the distributed network device.

In a twentieth aspect, there is provided an apparatus comprising means to perform the steps of the method according to the sixth aspect. The apparatus comprises means for in response to a distributed network device being to be disconnected with a centralized network device and a further distributed network device being to be connected with a further centralized network device, transmitting an interface resuming request from the further distributed network device to the further centralized network device, the interface resuming request being used for resuming an inactivated interface between the further centralized network device and the further distributed network device; and means for in response to receiving, from the further centralized network device, a resuming status message indicating the inactivated interface is successfully resumed, activating the inactivated interface to complete the resume procedure.

In a twenty first aspect, there is provided an apparatus comprising means to perform the steps of the method according to the seventh aspect. The apparatus comprises means for in response to a distributed network device being to be disconnected with a centralized network device and a further distributed network device being to be connected with a further centralized network device, receiving, at the further centralized network device, an interface resuming request from the further distributed network device, the interface resuming request being used for resuming an inactivated interface between the further centralized network device and the further distributed network device; means for determining, based on the interface resuming request, whether configuration parameters of the inactivated interface exist at the centralized network device; and means for in response to determining that the configuration parameters exist at the centralized network device, transmitting, to the distributed network device, a resuming status message indicating the interface is successfully resumed.

In a twenty second aspect, there is provided a computer readable medium having a computer program stored thereon which, when executed by at least one processor of a device, causes the device to carry out the method according to the first aspect.

In a twenty third aspect, there is provided a computer readable medium having a computer program stored thereon which, when executed by at least one processor of a device, causes the device to carry out the method according to the second aspect.

In a twenty fourth aspect, there is provided a computer readable medium having a computer program stored thereon which, when executed by at least one processor of a device, causes the device to carry out the method according to the third aspect.

In a twenty fifth aspect, there is provided a computer readable medium having a computer program stored thereon which, when executed by at least one processor of a device, causes the device to carry out the method according to the fourth aspect.

In a twenty sixth aspect, there is provided a computer readable medium having a computer program stored thereon which, when executed by at least one processor of a device, causes the device to carry out the method according to the fifth aspect.

In a twenty seventh aspect, there is provided a computer readable medium having a computer program stored thereon which, when executed by at least one processor of a device, causes the device to carry out the method according to the sixth aspect.

In a twenty eight aspect, there is provided a computer readable medium having a computer program stored thereon which, when executed by at least one processor of a device, causes the device to carry out the method according to the seventh aspect.

Other features and advantages of the embodiments of the present disclosure will also be apparent from the following description of specific embodiments when read in conjunction with the accompanying drawings, which illustrate, by way of example, the principles of embodiments of the disclosure.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

DETAILED DESCRIPTION

Figure 1:
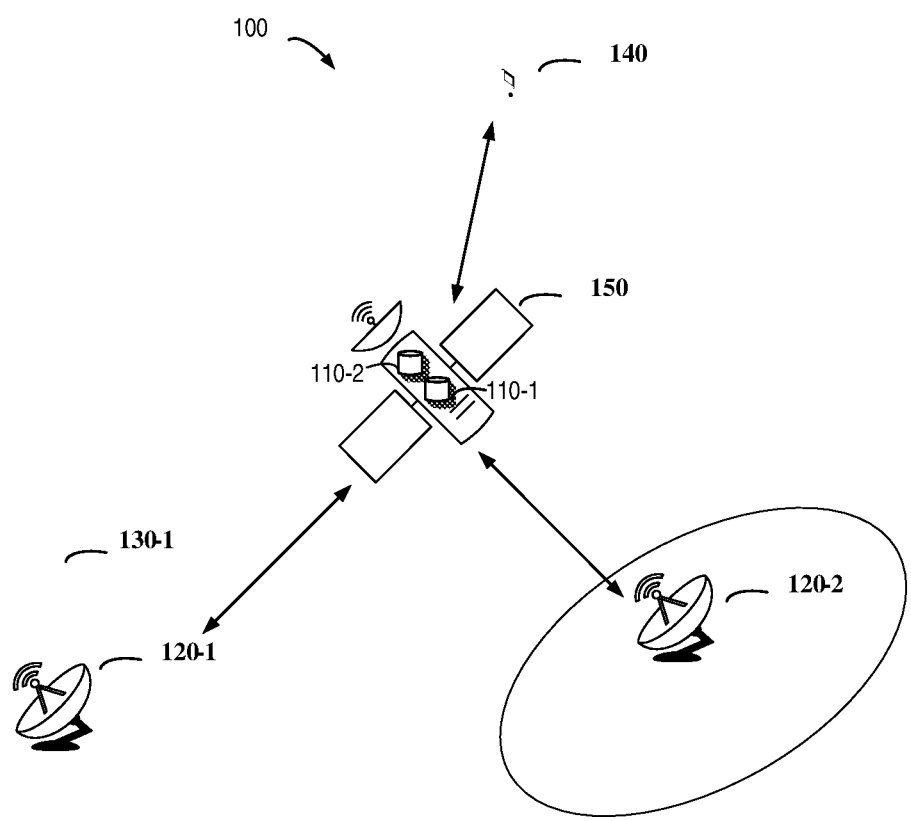
FIG. 1 shows an example communication network 100 in which embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication network" refers to a network that follows any suitable communication standards or protocols such as long term evolution (LTE), LTE-Advanced (LTE-A) and 5G NR, and employs any suitable communication technologies, including, for example, Multiple-Input Multiple-Output (MIMO), OFDM, time division multiplexing (TDM), frequency division multiplexing (FDM), code division multiplexing (CDM), Bluetooth, ZigBee, machine type communication (MTC), eMBB, mMTC and uRLLC technologies. For the purpose of discussion, in some embodiments, the LTE network, the LTE-A network, the 5G NR network or some variation of that for the non-terrestrial networks (NTN) or Integrated Access and Backhaul (IAB), e.g. for NTN, NR L1 and other NR protocol layers may need to be modified to be "satellite-friendly.".

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or eNB), a next generation NodeB (gNB), a Remote Radio Module (RRU), a radio header (RH), a remote radio head (RRH), a low power node such as a femto, a pico, a gNB Central Unit (gNB-CU), a gNB Distributed Unit (gNB-DU), an Access and Mobility Management Function (AMF), and the like. The centralized network device and distributed network device are two network devices that physically deployed, and connected via transport protocol and application protocol interface. For the purpose of discussion, in some embodiments, a centralized network device is a gNB-CU and a distributed network device is a gNB-DU, which is used as an example in the following description. In some other embodiments, a centralized network device is an Access and Mobility Management Function (AMF), and a distributed network device is a gNB.

The network device may also include any suitable device in a core network, for example, including multi-standard radio (MSR) radio equipment such as MSR BSs, network controllers such as radio network controllers (RNCs) or base station controllers (BSCs), Multi-cell/multicast Coordination Entities (MCEs), Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Position Centers (E-SMLCs), and/or Mobile Data Terminals (MDTs).

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), wireless customer-premises equipment (CPE) and/or NTN UE/satellite terminal. For the purpose of discussion, in the following, some embodiments will be described with reference to UEs as examples of the terminal devices, and the terms "terminal device" and "user equipment" (UE) may be used interchangeably in the context of the present disclosure.

As used herein, the term "cell" refers to an area covered by radio signals transmitted by a network device. The terminal device within the cell may be served by the network device and access the communication network via the network device.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

FIG. 1 shows a communication network 100 in which embodiments of the present disclosure can be implemented. The communication network 100 may comply with any suitable protocols or standards that already exist or will be developed in the future. In some embodiments, the communication network 100 may be the LTE (or LTE-A) network, the NR network or combination thereof.

The communication network 100 may comprise a distributed network device (hereafter also referred to as a gNB-DU 110-1), which may be located in a satellite 150. As an option, there may be more than one, for example two distributed network devices (hereafter also referred to as gNB-DUs 110-1 and 110-2) located in the satellite 150. The communication network 100 may also comprise centralized network device 120-1 and 120-2 (hereafter also referred to as gNB-CUs 120-1 and 120-2), which may be considered as a ground station. In general, a gNB-DU may be connected with a gNB-CU via F1 logical interface.

If there are multiple gNB-DUs active in a satellite, at least two F1 interfaces between gNB-DUs and gNB-CUs are active. Otherwise, there may be much more gNB-DUs located in a satellite. However, some F1 interfaces of the gNB-DUs are inactive.

Back to FIG. 1, a terminal device 140 may be served by the gNB-CUs 120-1 or 120-2 via the gNB-DUs 110-1 or 110-2 in the satellite. The gNB-CUs 120-1 and 120-2 could communicate with the gNB-DUs 110-1 and 110-2, if the satellite moves to the coverage area 130-1 or 130-2 of the gNB-CUs, respectively. The gNB-DUs 110-1 or 110-2 may communicate with the terminal device 140, to provide the service of the gNB-DU or gNB-CUs 120-1 and 120-2 to the terminal device.

It is to be understood that the number of network devices and the number of terminal devices as shown in FIG. 1 are only for the purpose of illustration without suggesting any limitations. The communication network 100 may include any suitable number of network devices and any suitable number of terminal devices adapted for implementing embodiments of the present disclosure. In addition, it would be appreciated that there may be various wireless communications as well as wireline communications (if needed) among these additional network devices and additional terminal devices.

The communications in the communication network 100 may conform to any suitable standards including, but not limited to, Global System for Mobile Communications (GSM), Extended Coverage Global System for Mobile Internet of Things (EC-GSM-IoT), Long Tenn Evolution (LTE), LTE-Evolution, LTE-Advanced (LTE-A), NR Radio Access (Including NTN specific variation of NR ("satellite friendly" NR), and including SRI (Satelite Radio Interface)), Wideband Code Division Multiple Access (WCDMA), Code Division Multiple Access (CDMA), GSM EDGE Radio Access Network (GERAN), and the like.

Furthermore, the communications in the communication network 100 may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In a 3rd Generation Partner Project (3GPP), TR 38.811 and TR38.821 are proposed to support non-terrestrial networks (NTN). One of the example architectures for the NTN is deploy a Centralized Unit-Distributed Unit (CU-DU) high layer split, such that the gNB-DU is located in the satellite while the gNB-CU is on the ground. Any other suitable architecture may be also possible for this case. The same CU-DU split architecture is also under study in the Integrated Access and Backhaul (IAB) 3GPP study item as one architecture option (TR 38.874).

TR 38.811 and TR38.821 specifies mapping relationship of the logical architecture of NR RAN and the physical architecture of NTN, which shows in the table as below.

TABLE 1 mapping options of the logical architecture of NR RAN onto the physical architecture of NTN

| Mapping options | Satellite/ HAPS Service link | Satellite/HAPS feeder link | Terminal side | Network side |
|---|---|---|---|---|
| 1 Bentpipe payload | NR-Uu radio interface | NR-Uu radio interface | UE | NTN Remote Radio Unit + gNB |
| 2 Processed payload (gNB-DU) | NR-Uu radio interface | F1 over Satellite radio interface (SRI) | UE | NTN Remote Radio Unit + SRI modems + gNB-CU |
| 3 Processed payload (gNB) | NR-Uu radio interface | N1, N2, N3 over Satellite radio interface (SRI) | UE | NTN Remote Radio Unit + SRI moderns |

Given that the NTN feature longer propagation delays, the timers associated to the protocols transported over the feeder and service links may require to be extended. This applies for example to F1 as well as N1, N2 and N3 reference points.

In mapping option 1, the Satellite or HAPS implements an RF repeater (with frequency conversion), whereas in mapping option 2, they implement the gNB-DU functionality.

As described above, in the traditional terrestrial network, as well as in other regular cases, the DU is not moving. However, in NTN, the DU is located in a satellite which should be in a moving state all the time. A logical interface F1 over Satellite Radio Interface (SRI) may be supported between the gNB-DU and the gNB-CU, through which the gNB-DU may communicate with the gNB-CU. For NTN, when the gNB-DU (i.e. a satellite) moves from the area served by one gNB-CU (i.e. a Ground station, (GS)) to another gNB-CU, the gNB-DU may be connected to the new gNB-CU via the F1 interface. Currently, F1 interface is established and configured in the deployment phase of the gNB-DU.

In current satellite communication systems, the interfaces are proprietary and as well the management of the satellite movement is vendor-specific. One target for the 3GPP NTN architecture is to be able to reuse and deploy standard 5G solutions and procedures as much as possible, in particular to lower the cost and complexity of the current proprietary satellite systems.

In the future, it is expected that a constellation of e.g. 200-500 LEO (Low Earth Orbit) satellites and e.g. 100-200 GS (Ground Stations) offer communication services with (near) global coverage. Each satellite stays within service of one GS e.g. for a duration of only a few minutes, after which it is being serviced by a new GS. The satellite revisits the same GS e. g. around once per day (depending on orbit).

The present discloses is proposed to avoid the service break described above and support mobility of the distributed network device. In the frame of the present discloses, the additional issue is that the interface needs to be constantly set-up and then shutdown. The term "interface" herein may be referred to as a F1 interface (carrying F1 AP), an N2 interface (carrying NG AP) with a network device on satellite, an AMF as ground station or other possible interfaces between the distributed network device and the centralized network device. As an example, the present disclose adopts the F1 interface to explain the embodiment of the process for changing the centralized network device. It should be understood that any other logical interfaces or any other split architecture may also be possible for this approach.

In this case, every time the satellite 150 (gNB-DU) travels to the area of new GS (gNB-CU), a new logical F1 interface needs to be activated. The gNB-DU needs to be optimized for power consumption and computing requirements. Currently, there are too much information carried in the procedure for defining F1 set up, even some of them are unnecessarily in most NTN case.

For example, with reference to FIG. 1, in a centralized network device change procedure, one or more gNB-DU(s) located in the satellite 150 may leave the coverage range 130-1 of the gNB-CU 120-1 and enters the coverage range 130-2 of the gNB-CU 120-2 during the movement of the satellite 150. The conventional F1 interface set up procedure may cause that the gNB-DU could not be connected with the gNB-CU 120-2 immediately, which may break the service provided to the UE 140 by the gNB-DU.

According to the present disclosure, in this centralized network device change procedure, the gNB-DU should maintain the connectivity for the accessed UE 140 by optimizing the procedure for configuring or reconfiguring the F1 interface. In this way, the connection between the gNB-DU and UE 140 will not be broken when the gNB-DU is moving to the area of a new gNB-CU 120-2 from the gNB-CU 120-1, Since the satellite hosting gNB-DU 110-1 and 110-2, will establish and maintain F1 connectivity to both gNB-CU 120-1 and gNB-CU 120-2 for a certain duration of time.

Figure 2:
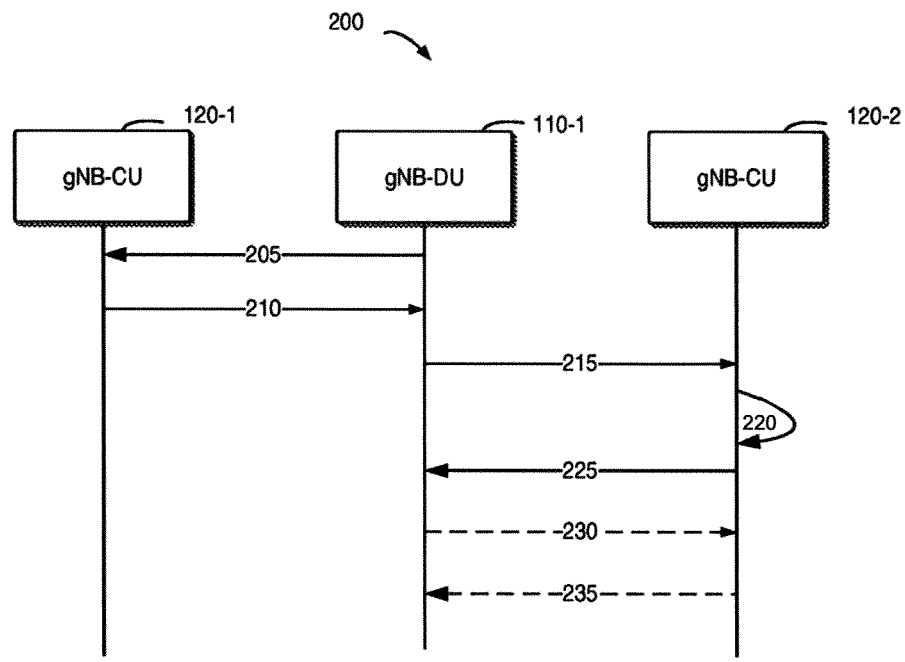
FIG. 2 shows a diagram of an example process 200 for a centralized network device change procedure in non-terrestrial networks according to some embodiments of the present disclosure.

Principle and implementations of the present disclosure will be described in detail below with reference to FIG. 2-8. FIG. 2 shows a process 200 according to embodiments of the present disclosure. For the purpose of discussion, the process 200 will be described with reference to FIG. 1. The process 200 may involve centralized network device change procedure in a case that there is only one gNB-DU 110-1 located in the satellite 150.

There may be one or multiple logical F1 interface(s) on the satellite. The satellite may need to activate and bring up a particular F1 interface needed for a particular duration of time of satellite's movement and also gracefully suspend that F1 interface that is no longer needed (until during the next time the satellite is at the reach of that same GS and same gNB-CU).

Thus, every gNB-DU holds a high number of potential F1s where some of those potential F1s are in-active while typically only one is active at a time. For satellite it is essential to minimize power consumption and avoid unnecessary transmission or heavy computing operations.

In NTN case, the satellite periodically visit the same Ground Station, and attaching to the gNB-CU of that GS. Depending on the orbit of the satellite, this takes place around in a certain time period, for example, once per day. Unless configuration changes take place (not expected daily but rather on monthly basis or even more seldom), all F1 parameters stay identical between successive visits to the same GS/gNB-CU, and those parameters need not be transferred completely in each visiting time. Instead, the gNB-CUs and gNB-DUs may obtain these parameters from local memory. It should be understood that in the initial start-up phase, all parameters and full F1 set-up may be needed, although also those can be provided to the satellite and gNB-CU (GS) by initial configuration and not by F1 set-up over the radio link.

In this case, as shown in FIG. 2, if the satellite moves to the coverage of gNB-CU 120-2 from the coverage of the gNB-CU 120-1, the terminal device 140 may be switched to be served by gNB-CU 120-2, the gNB-DU 110-1 may transmit 205 an interface suspending request to gNB-CU 120-1. The gNB-DU 110-1 may determine the need to initiate the interface suspend procedure based on various criteria, for example, based on the configured time, or the location of the gNB-DU 110-1 (or satellite), or the quality of the radio connection or interface between the gNB-DU 110-1 and the ground station or gNB-CU 120-1, etc. The interface suspending request may be used for suspending the activated interface between the gNB-DU 110-1 and the gNB-CU 120-1.

In some example embodiments, the gNB-DU 110-1 may transmit one or more information in the interface suspending request, for example, the message type associated with the interface suspending request, the identity of a transaction initiated by the interface suspending request and an identity of the gNB-DU 110-1.

TS 38.473 specifies the message type in the table as below:

TABLE 2

| Message type | | | | |
|---|---|---|---|---|
| IE/Group Name | Presence | Range | IE type and reference | Semantics description |
| Message Type | | | | |
| >Procedure Code | M | | INTEGER (0 ... 255) | |
| >Type of Message | M | | CHOICE (Initiating Message, Successful Outcome, Unsuccessful Outcome, ...) | |

In this case, the message type uniquely identifies the message being sent in the interface suspending request.

TS 38.473 specifies the identity of a transaction in the table as below:

TABLE 3

| Transaction ID | | | | |
|---|---|---|---|---|
| IE/Group Name | Presence | Range | IE type and reference | Semantics description |
| Transaction ID | M | | INTEGER (0 ... 255, ...) | |

The Transaction ID IE uniquely identifies a procedure among all ongoing parallel procedures of the same type initiated by the same protocol peer. Messages belonging to the same procedure shall use the same Transaction ID. The Transaction ID is determined by the initiating peer of a procedure. In this case, the Transaction ID may be the identity of a transaction initiated by the interface suspending request.

TS 38.473 specifies the identity of a distributed network device in the table as below:

TABLE 4 gNB-DU ID

| IE/Group Name | Presence | Range | IE type and reference | Semantics description |
|---|---|---|---|---|
| gNB-DU ID | M | | INTEGER (0 ... 236-1) | The gNB-DU ID is independently configured from cell identifiers, i.e. no connection between gNB-DU ID and cell identifiers. |

The gNB-DU ID uniquely identifies the gNB-DU. In this case, the gNB-DU ID may indicate the ID of the gNB-DU 110-1. Alternatively, a gNB-DU name may be used to identify the gNB-DU.

In some example embodiments, the gNB-DU 110-1 may also transmit an indication of a time period for keeping configuration parameters of the activated interface by the gNB-CU 120-1; an indication for indicating whether a transport protocol being kept by the gNB-CU 120-1 after the activated interface being suspended; and an indication for indicating whether a security context being kept by the gNB-CU 120-1 after the activated interface being suspended. Typically it is expected, that the F1 AP is cryptographically protected, e. g. by means of IPsec (IP security suite of protocols).

The gNB-CU 120-1 receives the interface suspending request from the gNB-DU 110-1 and generates a suspending confirmation message indicating the interface is ready to be suspended based on the interface suspending request. The gNB-CU 120-1 transmits 210 the suspending confirmation message to the gNB-DU 110-1.

The gNB-DU 110-1 may suspend the the interface after receiving the suspending confirmation message from the gNB-CU 120-1. The interface now becomes inactivated.

If the activated interface between the gNB-DU 110-1 and the gNB-CU 120-1 is suspended (or inactivated), the gNB-DU 110-1 transmits 215 an interface resuming request to the gNB-CU 120-2. The gNB-DU 110-1 may determine the need to initiate the interface resume procedure based on various criteria, for example, based on the configured time, or the location of the gNB-DU 110-1 (or satellite), the quality of the radio connection between the gNB-DU 110-1 and the ground station or gNB-CU 120-2, etc. The interface resuming request may be used for resuming an inactivated interface between the gNB-CU 120-2 and the gNB-DU 110-1.

In some example embodiments, the gNB-DU 110-1 may transmit at least one of the following information in the interface resuming request. For example, a message type associated with the interface resuming request, an identity of a transaction initiated by the interface resuming request and an identity or name of the distributed network device. These parameters are similar with the examples shown in tables 2-4.

The gNB-CU 120-2 receives an interface resuming request from the gNB-DU 110-1 and determines 220, based on the interface resuming request, whether the configuration parameters of the interface exist at the gNB-CU 120-2. That is, the gNB-CU 120-2 may determine whether the gNB-DU 110-1 have already visited the gNB-CU 120-2 before.

If the gNB-CU 120-2 may determine that the configuration parameters exist at the gNB-CU 120-2, the gNB-CU 120-2 transmits 225 a resuming status message to the gNB-DU 110-1. The resuming status message may indicate the interface is successfully resumed.

If the gNB-DU 110-1 receives the resuming status message indicating the interface is successfully resumed, the gNB-CU 120-2 activates the interface to complete the resume procedure.

As described above, the gNB-CU 120-2 receives an interface resuming request from the gNB-DU 110-1 and determines 220, based on the interface resuming request, whether the configuration parameters of the interface exist at the gNB-CU 120-2. That is, the gNB-CU 120-2 may determine whether the gNB-DU 110-1 has already visited the gNB-CU 120-2 before and whether the configuration parameters are still stored in the gNB-CU 120-2.

If the gNB-CU 120-2 may determine that the configuration parameters not exist at the gNB-CU 120-2, the gNB-CU 120-2 transmits 225 a resuming status message to the gNB-DU 110-1. The resuming status message may indicate the interface is unsuccessfully resumed. The interface is unsuccessfully resumed may include at least one of the following cases: a) the whole configuration is completed lost; and b) only partial reconfiguration is needed. For case a, the whole configuration may have to be transmitted to the gNB-CU 120-2. That is, the gNB-DU 110-1 may not have visited the gNB-CU 120-2 before. Thus, the configuration parameters of the interface may not be stored in the gNB-CU 120-2. It may also be possible that the gNB-DU 110-1 has visited the gNB-CU 120-2 before, but the gNB-CU 120-2 has removed the stored configuration parameters for the gNB-DU 110-1, for example, upon the expiration of the timer to keep the configuration parameters for the gNB-DU 110-1, or due to re-initialization of the gNB-CU 120-2. For case b, only partial reconfiguration may have to be transmitted to the gNB-CU 120-2.

The gNB-DU 110-1 may further transmit 230 the configuration parameters of the inactivated interface to the the gNB-CU 120-2. The gNB-CU 120-2 may receive the configuration parameters of the interface and generate a configuration confirmation message indicating the configuration parameters are successfully received by the gNB-CU 120-2. Then the gNB-CU 120-2 may transmit 235 the configuration confirmation message to the gNB-DU 110-1.

Figure 3:
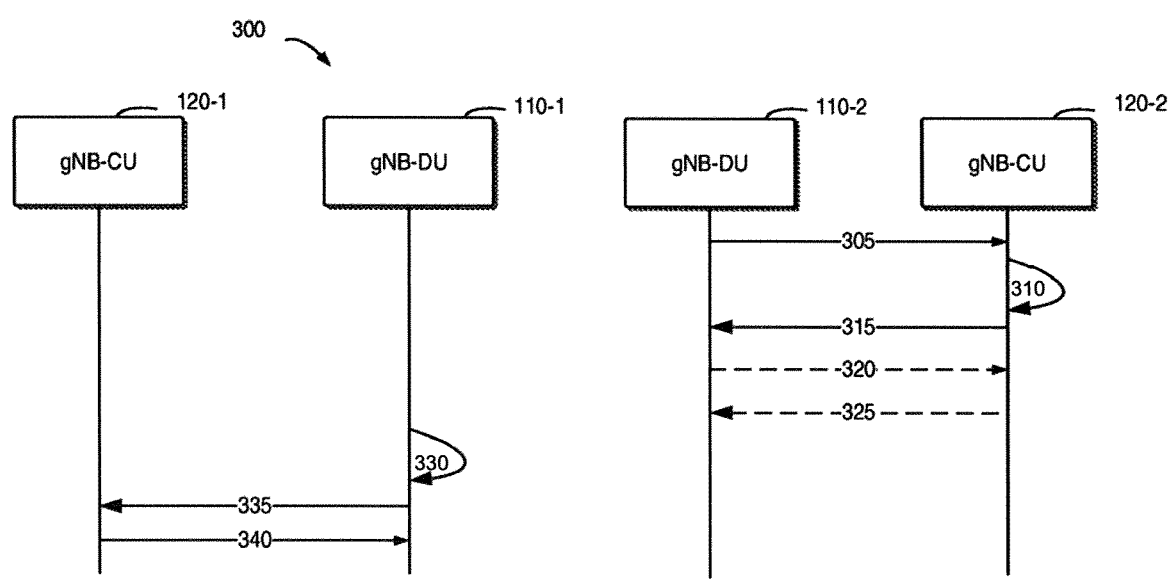
FIG. 3 shows a diagram of an example process 300 for a centralized network device change procedure in non-terrestrial networks according to some embodiments of the present disclosure.

FIG. 3 shows a process 300 according to embodiments of the present disclosure. For the purpose of discussion, the process 300 will be described with reference to FIG. 1. The process 300 may involve a centralized network device change procedure, for example, in non-terrestrial networks in a case that there are more than one gNB-DU (for example, two gNB-DUs 110-1 and 110-2) located in the satellite 150.

The use of multiple logical gNB-DU in a single physical baseband hardware (physically in the satellite) allows the satellite's each logical gNB-DU to maintain separate connectivity and separate logical F1 interface to a particular gNB-CU at the same time.

In this case, as shown in FIG. 3, if the satellite moves to the coverage of gNB-CU 120-2 from the coverage of the gNB-CU 120-1, the terminal device 140 may be switched to be served by gNB-CU 120-2. In this case, there are two active F1 interfaces in the satellite, i.e. via gNB-DU 110-1 and via gNB-DU 110-2.

For seamless communications for the access UEs (for example, the terminal device 140), a particular satellite can appear as two active logical gNB-DUs. That is, gNB-DU 110-1 and logical F1 connected to the gNB-CU 120-1 and the gNB-DU 110-2 and logical F1 connected to the gNB-CU 120-2. Each gNB-CU is also prepared to serve multiple gNB-DUs that physically are located on different satellites.

Currently, the interface F1 between the gNB-DU 110-1 and the gNB-CU 120-1 is operational, which means that the terminal device 140 is served by the gNB-CU 120-1 via the gNB-DU 110-1. When the satellite is going to move out of the coverage of gNB-CU 120-1 and is going to enter the coverage of gNB-CU 120-2, the gNB-DU 110-2 transmits 305 an interface resuming request to the gNB-CU 120-2. The gNB-DU 110-2 may determine the need to initiate the interface resume procedure based on various criteria, for example, based on the configured time, or the location of the gNB-DU 110-2 (or satellite), the quality of the radio connection between the gNB-DU 110-2 and the ground station or gNB-CU 120-2, etc. The interface resuming request may be used for resuming an inactivated interface between the gNB-CU 120-2 and the gNB-DU 110-2.

In some example embodiments, the gNB-DU 110-2 may transmit at least one of the following information in the interface resuming request. For example, a message type associated with the interface resuming request, an identity of a transaction initiated by the interface resuming request and an identity of the gNB-DU 110-2. These parameters are similar with the examples shown in tables 2-4.

The gNB-CU 120-2 receives an interface resuming request from the gNB-DU 110-2 and determines 310, based on the interface resuming request, whether the configuration parameters of the interface exist at the gNB-CU 120-2.

If the gNB-CU 120-2 determines that the configuration parameters exist at the gNB-CU 120-2, the gNB-CU 120-2 transmits 315 a resuming status message to the gNB-DU 110-2. The resuming status message may indicate the interface is successfully resumed.

If the gNB-DU 110-2 receives the resuming status message indicating the interface is successfully resumed, the gNB-DU 110-2 activates the interface to complete the resume procedure.

Similarly, if the gNB-CU 120-2 may determine that the configuration parameters not exist at the gNB-CU 120-2, the gNB-CU 120-2 transmits 315 a resuming status message to the gNB-DU 110-2. The resuming status message may indicate the interface is unsuccessfully resumed. The interface is unsuccessfully resumed may include at least one of the following cases: a) the whole configuration is completed lost; and b) only partial reconfiguration is needed. For case a, the whole configuration may have to be transmitted to the gNB-CU 120-2. That is, the gNB-DU 110-2 may not have visited the gNB-CU 120-2 before. Thus, the configuration parameters of the interface may not be stored in the gNB-CU 120-2. It may also be possible that the gNB-DU 110-2 has visited the gNB-CU 120-2 before, but the gNB-CU 120-2 has removed the stored configuration parameters for the gNB-DU 110-1, for example, upon the expiration of the timer to keep the configuration parameters for the gNB-DU 110-2, or due to re-initialization of the gNB-CU 120-2. For case b, only partial reconfiguration may have to be transmitted to the gNB-CU 120-2.

The gNB-DU 110-2 may further transmit 320 the configuration parameters of the inactivated interface to the the gNB-CU 120-2. The gNB-CU 120-2 may receive the configuration parameters of the interface and generate a configuration confirmation message indicating the configuration parameters are successfully received by the gNB-CU 120-2. Then the gNB-CU 120-2 may transmit 325 the configuration confirmation message to the gNB-DU 110-2. Once the F1 interface is resumed, the satellite may initiate the handover procedure to move the connected UE from gNB-DU 110-1/gNB-CU 120-1 to gNB 110-2/gNB-CU2 120-2.

That is, the terminal device has been switched to be served by the gNB-CU 120-2. If the gNB-DU 110-1 determines 330 that the terminal device 140 has been handed over from the gNB-CU 120-1 to the gNB-CU 120-2, the gNB-DU 110-1 may transmit 335 an interface suspending request to gNB-CU 120-1. There is also the possibility that there may be no terminal devices connected to the gNB-DU 110-1. The gNB-DU 110-1 may determine the need to initiate the interface suspend procedure based on various criteria, for example, based on the configured time, or the location of the gNB-DU 110-1 (or satellite), the quality of the interface between the gNB-DU 110-1 and the ground station or gNB-CU 120-1, etc. The gNB-DU 110-1 may also decide the need to initiate the interface suspend procedure based on other criteria. For example, one implementation may use the internal communication for the gNB-DU 110-2 to inform the gNB-DU 110-1 that the interface resume procedure is completed and the interface suspend procedure can be started. The interface suspending request may be used for suspending the activated interface between the gNB-DU 110-1 and the gNB-CU 120-1.

In some example embodiments, the gNB-DU 110-1 may transmit one or more information in the interface suspending request, for example, the message type associated with the interface suspending request, the identity of a transaction initiated by the interface suspending request and an identity of the NB-DU 110-1.

In some example embodiments, the gNB-DU 110-1 may also transmit an indication of a time period for keeping configuration parameters of the activated interface by the gNB-CU 120-1; an indication for indicating whether a transport protocol being kept by the gNB-CU 120-1 after the activated interface being suspended; and an indication for indicating whether a security context being kept by the gNB-CU 120-1 after the activated interface being suspended.

The gNB-CU 120-1 receives the interface suspending request from the gNB-DU 110-1 and generates a suspending confirmation message indicating the interface is ready to be suspended based on the interface suspending request. The gNB-CU 120-1 transmits 340 the suspending confirmation message to the gNB-DU 110-1.

The gNB-DU 110-1 may suspend the the interface after receiving the suspending confirmation message from the gNB-CU 120-1.

In this way, when a gNB-DU which is located at the satellite and moves along with the satellite, moves from the coverage of a gNB-CU to the coverage of a new gNB-CU, a terminal device, which is served by a gNB-CU via one gNB-DU, will keep the connection with the gNB-CU, such that the connectivity of the accessed terminal device will be maintained and meanwhile the signalling overhead for interface configuration will be saved.

As mentioned above, the F1 interface resume occurs when the satellite (gNB-DU) attaches or reattaches to the GS (gNB-CU). The F1 interface in-active occurs after the satellite leaves the GS and all active NTN UEs may be handed over to the new gNB-CU.

The present disclosure proposed two new F1 procedures to shorten and simplifying the procedure in the NTN case, where most of the parameters included in F1 set up, are already given and available, and need not be re-transmitted at every visit of the satellite to the particular GS.

Additionally, it may be useful to tailor the underlying transport protocols tolerance to the inactive state (especially cryptographic protection), as described below. Note that there may be alternative cryptographic protection mechanisms depending on the 3GPP progress of the NTN study item. An indication may be included in the interface suspending request to indicate whether the security context should be kept during the inactive period. Another indication may be included in the interface suspending request to indicate whether the underlying transport protocol should be kept during the inactive period. Some examples described below can be used.

The F1 control plane interface needs to be cryptographically protected. The cryptographic protection service at the underlying IPsec layer (protocol stack: F1-AP/SCTP/IPsec), shall also be tailored to support the F1 in-active/F1 resume. IPsec SAs should be (optionally, depending on configuration) possible to withstand two successive visits, e. g. by configuring the lifetimes accordingly. After F1 suspend request, the IPsec endpoints should not trigger liveliness checks in absense of traffic and (optionally, depending on configuration) not delete security associations, as after suspend there is no traffic expected before a new resume. After resume request, IPsec SA and IKE SA may be rekeyed with or without key exchange (KE, Diffie-Hellman exchange). Reauthentication (proving that the endpoints have access to the long term credentials) period should be configurable (These topics have to be configurable, however, to match the intended operator security requirement.

The IPsec supports detection of the liveliness of the peer. Depending on parameterization, it assumes peer down in case of no traffic or no response after some tens of seconds/minutes, deleting IKE SA and IPsec SAs and triggering an alarm. Lifetime of IKE SA and IPsec SA are configurable parameters, with max value of, e.g., 24 hrs in some implementation. Before expiry of the lifetime, the SAs are rekeyed. It is proposed to extend the max values to cover longer lifetime (more than 24 hrs) and also optionally not tear down IKE SA and Ipsec SA during extended idle period after F1 suspend.

It is as well proposed that the rekeying is started during to occur during the active communication period, and then have the lifetime lasting at least until the next visit to the same GS. This avoids long set-up delay that would occur, if the lifetime expires during the inactive period, and the negotiation has to be started as the first step the satellite has again communication link to that GS.

Below F1-AP protocol, SCTP (Stream Control Transmission Protocol) is used. SCTP may be tailored to keep the session up for F1-AP between suspend and resume. This is not as essential, since the SCTP handshake is neither complex nor computationally heavy, however parameters related to SCTP also likely stay the same, so having the association stay alive (although with no traffic flow), saves transmission bandwidth and power. SCTP times out (depending on parameterization) in tens of seconds/few minutes. SCTP shutdown should be issued after the F1 suspend procedure and SCTP initial before the F1 resume procedure, unless it is decided to keep the SCTP session alive e. g. by disabling heartbeats and allowing the association to stay alive after F1 suspend with no traffic.

After the F1 resume procedure, there should be neither IPsec peer liveliness check nor tear-down of the IPsec Sas. The peer liveliness checking may be active during the active period between F1 resume and F1 in-active. Before F1 resume request, SCTP may be re-initiated, unless the session is kept alive.

F1 in-active shall gracefully shutdown the F1 interface with no alarms raised. SCTP shutdown may be issued after F1 in-active. Alternatively, the F1 suspend procedure may trigger both gNB-CU and the gNB-DU to temporarily deactivate the SCTP heartbeat check to keep the SCTP association alive during the F1 in-active period. This may help when the gNB-DU send the resume request later, without having to re-initiate the SCTP establishment.

Alternatively, the F1 in-active and F1 Resume may be implemented by enhancing current DU Configuration Update procedure. For example, a new IE can be added in the DU CONFIGURATION UPDATE message to indicate the DU will be inactive, or resume. It should be noted that the inactive will be different than current deactivate a cell, which can only be triggered by the CU.

The benefit with the approach of the present disclosure is the avoidance of transferring full set of F1 parameters as in the F1 set up message every time the satellite re-visits the same GS. This reduces both transmissions over the long radio link (power consumption) and the computing needed at the satellite. Without the approach of the present disclosure, once the satellite system is running, full F1 set-up would be needed every time the satellite enters the service area of the next GS. With the optimized procedure, only very short resume message need to be transmitted in the typical case with no configuration changes. Optimizing the security association lifetimes and re-keying times, avoids breaks due to re-keying, and excessive computing needs (power consumption, time).

More details of the example embodiments in accordance with the present disclosure will be described with reference to FIGS. 4-10.

Figure 4:
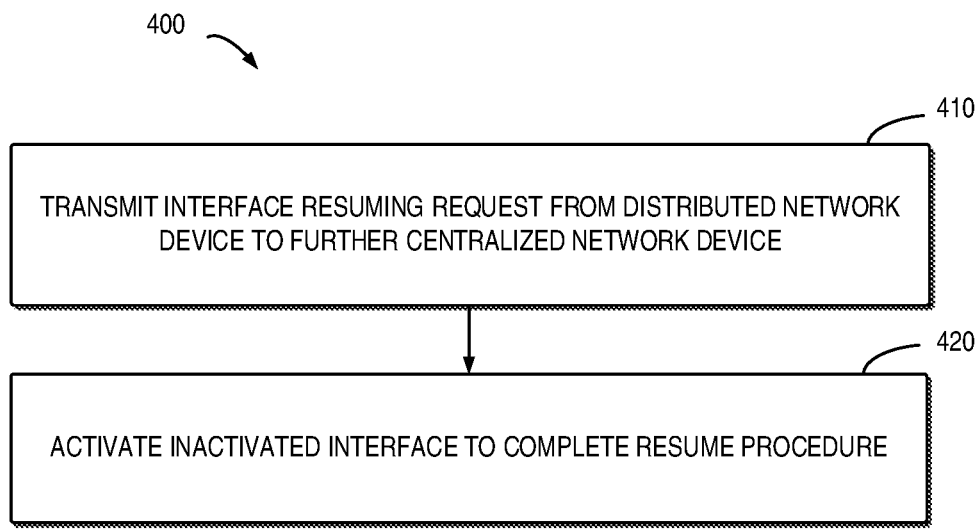
FIG. 4 shows a flowchart of an example method 400 for a centralized network device change procedure in non-terrestrial networks according to some embodiments of the present disclosure.

FIG. 4 shows a flowchart of an example method 400 for a centralized network device change procedure in non-terrestrial networks according to some embodiments of the present disclosure. The method 400 can be implemented at the gNB-DU 110-1 as shown in FIGS. 1-2. For the purpose of discussion, the method 400 will be described with reference to FIGS. 1-2.

As shown in FIG. 4, at 410, if the gNB-DU 110-1 is to be disconnected with gNB-CU 120-1 and connected with the gNB-CU 120-2, the gNB-DU 110-1 transmits an interface resuming request from the gNB-DU 110-1 to the gNB-CU 120-2, the interface resuming request being used for resuming an inactivated interface between the gNB-CU 120-2 and the gNB-DU 110-1. The terminal device 140 is served by the gNB-CU 120-1 via the gNB-DU 110-1. The gNB-DU 110-1 may determine the need to initiate the interface resume procedure based on various criteria, for example, based on the configured time, or the location of the gNB-DU 110-1 (or satellite), the quality of the interface between the gNB-DU 110-1 and gNB-CU 120-2, etc.

In some example embodiments, the gNB-DU 110-1 may transmit the interface resuming request comprises transmitting at least one of the following: a message type associated with the interface resuming request; an identity of a transaction initiated by the interface resuming request; and an identity of the gNB-DU 110-1.

At 420, if the gNB-DU 110-1 receives, from the gNB-CU 120-2, a resuming status message indicating the interface is successfully resumed, the gNB-DU 110-1 activates the interface to complete the resume procedure.

In some example embodiments, if the gNB-DU 110-1 receives, from the gNB-CU 120-2, a resuming status message indicating the interface is unsuccessfully resumed, the gNB-DU 110-1 may transmit the configuration parameters of the interface to the gNB-CU 120-2. If the gNB-DU 110-1 receives, from the gNB-CU 120-2, a configuration confirmation message indicating the configuration parameters is successfully received by the gNB-CU 120-2, the gNB-DU 110-1 activates the interface to complete the resume procedure.

In some example embodiments, the gNB-DU 110-1 may transmit an interface suspending request from the gNB-DU 110-1 to the gNB-CU 120-1, the interface suspending request being used for suspending an activated interface between the gNB-DU 110-1 and the gNB-CU 120-1. The gNB-DU 110-1 may further receive, from the gNB-CU 120-1, a suspending confirmation message indicating the activated interface is ready to be suspended, the suspending confirmation message being generated by the gNB-CU 120-1 in response to the interface suspending request.

In some example embodiments, the gNB-DU 110-1 may transmit the interface suspending request comprises transmitting at least one of the following: a message type associated with the interface suspending request; an identity of a transaction initiated by the interface suspending request; an identity of the gNB-DU 110-1, an indication of a time period for keeping configuration parameters of the activated interface by the gNB-CU 120-1 an indication for indicating whether a transport protocol being kept by the gNB-CU 120-1 after the activated interface being suspended; and an indication for indicating whether a security context being kept by the gNB-CU 120-1 after the activated interface being suspended.

Figure 5:
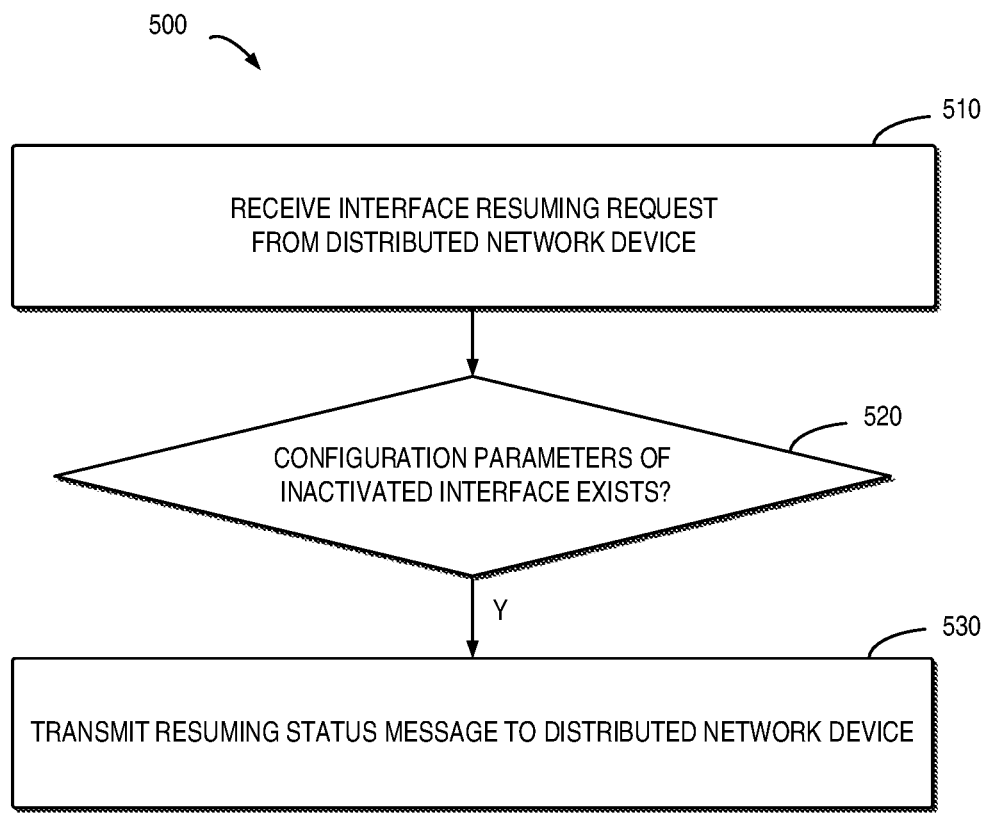
FIG. 5 shows a flowchart of an example method 500 for a centralized network device change procedure in non-terrestrial networks according to some embodiments of the present disclosure.

FIG. 5 shows a flowchart of an example method 500 for a centralized network device change procedure in non-terrestrial networks according to some example embodiments of the present disclosure. The method 500 can be implemented at the gNB-CU 120-2 as shown in FIGS. 1-2. For the purpose of discussion, the method 500 will be described with reference to FIGS. 1-2.

As shown in FIG. 5, at 510, if the gNB-DU 110-1 is to be disconnected with gNB-CU 120-1 and connected with the gNB-CU 120-2, the gNB-CU 120-2 receives an interface resuming request from the gNB-DU 110-1, the interface resuming request is used for resuming an inactivated interface between the gNB-CU 120-2 and the gNB-DU 110-1 and is transmitted by the gNB-DU 110-1. The terminal device 140 may be served by the gNB-CU 120-1 via the gNB-DU 110-1.

In some example embodiments, the gNB-CU 120-2 may receive the interface resuming request which comprises at least one of the following: a message type associated with the interface resuming request; an identity of a transaction initiated by the interface resuming request; and an identity of the gNB-DU 110-1.

At 520, the gNB-CU 120-2 determines, based on the interface resuming request, whether the configuration parameters exist at the gNB-CU 120-2.

At 530, if the gNB-CU 120-2 determines the configuration parameters exist at the gNB-CU 120-2, the gNB-CU 120-2 transmits a resuming status message indicating the interface is successfully resumed to the gNB-DU 110-1.

In some example embodiments, if the gNB-CU 120-2 determines the configuration parameters not exist at the gNB-CU 120-2, the gNB-CU 120-2 may transmit the resuming status message indicating the interface is unsuccessfully resumed to the gNB-DU 110-1. The gNB-CU 120-2 may receive the configuration parameters of the interface from the gNB-DU 110-1. The gNB-CU 120-2 may further generate a configuration confirmation message indicating the configuration parameters is successfully received by the gNB-CU 120-2 and transmit the configuration confirmation message to the gNB-DU 110-1.

Figure 6:
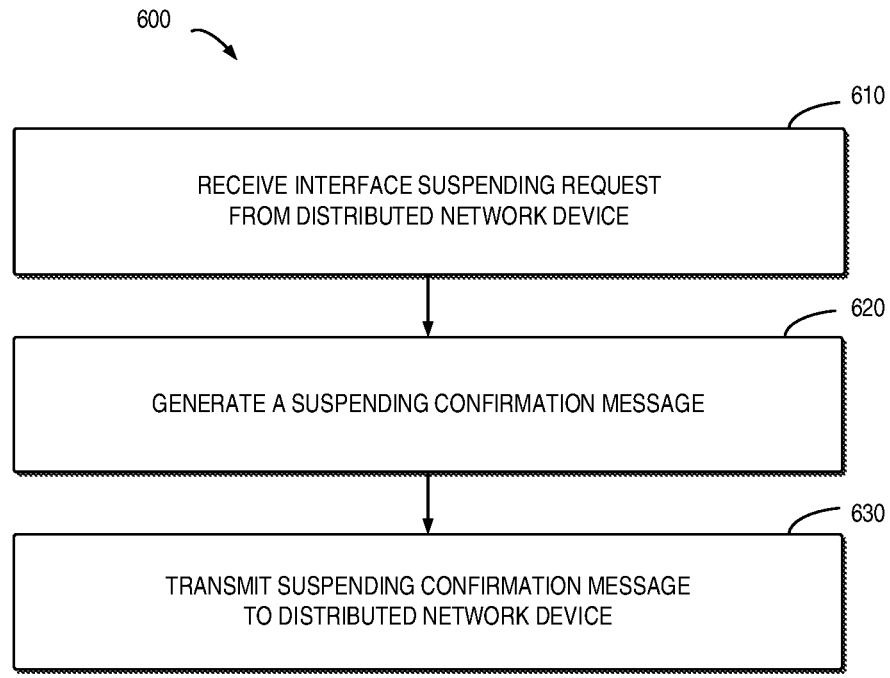
FIG. 6 shows a flowchart of an example method 600 for a centralized network device change procedure in non-terrestrial networks according to some embodiments of the present disclosure.

FIG. 6 shows a flowchart of an example method 600 for a centralized network device change procedure, for example, in non-terrestrial networks according to some example embodiments of the present disclosure. The method 600 can be implemented at the gNB-CU 120-1 as shown in FIGS. 1-2. For the purpose of discussion, the method 600 will be described with reference to FIGS. 1-2.

As shown in FIG. 6, at 610, if the gNB-DU 110-1 is to be disconnected with gNB-CU 120-1 and connected with the gNB-CU 120-2 and F1 interface between the gNB-DU 110-1 and the gNB-CU 120-2 is to be resumed, the gNB-CU 120-1 receives an interface suspending request from the gNB-DU 110-1 to the gNB-CU 120-1. The interface suspending request is used for suspending an activated interface between the gNB-DU 110-1 and the gNB-CU 120-1.

In some example embodiments, the gNB-CU 120-1 may receive the interface suspending request which comprises at least one of the following: a message type associated with the interface suspending request; an identity of a transaction initiated by the interface suspending request; an identity of the gNB-DU 110-1, an indication of a time period for keeping configuration parameters of the activated interface by the gNB-CU 120-1 an indication for indicating whether a transport protocol being kept by the gNB-CU 120-1 after the activated interface being suspended; and an indication for indicating whether a security context being kept by the gNB-CU 120-1 after the activated interface being suspended.

At 620, the gNB-CU 120-1 generates, based on the interface suspending request, a suspending confirmation message indicating the interface is ready to be suspended. At 630, the gNB-CU 120-1 transmits the suspending confirmation message to the gNB-DU 110.

Figure 7:
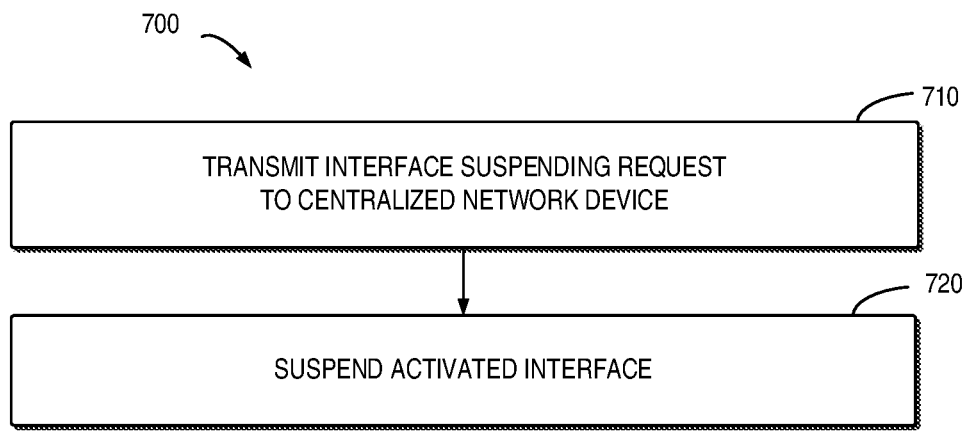
FIG. 7 shows a flowchart of an example method 700 for a centralized network device change procedure in non-terrestrial networks according to some embodiments of the present disclosure.

FIG. 7 shows a flowchart of an example method 700 for a centralized network device change procedure, for example, in non-terrestrial networks according to some embodiments of the present disclosure. The method 700 can be implemented at the gNB-DU 110-1 as shown in FIGS. 1-2. For the purpose of discussion, the method 700 will be described with reference to FIGS. 1-2.

At 710, if the gNB-DU 110-1 is to be disconnected with a gNB-CU 120-1 and a gNB-DU 110-2 is to be connected with gNB-CU 120-2 and an inactivated interface between the gNB-DU 110-2 and the gNB-CU 120-2 is successfully resumed, the gNB-DU 110-1 transmits an interface suspending request from the gNB-DU 110-1 to the gNB-CU 120-1. The interface suspending request is used for suspending an activated interface between the gNB-DU 110-1 and the gNB-CU 120-1. The gNB-DU 110-1 may determine the need to initiate the interface suspend procedure based on various criteria, for example, based on the configured time, or the location of the gNB-DU 110-1 (or satellite), the quality of the interface between the gNB-DU 110-1 and gNB-CU 120-1, etc.

At 720, if the gNB-DU 110-1 receives, from the gNB-CU 120-1, a suspending confirmation message indicating the activated interface is ready to be suspended, the gNB-DU 110-1 suspends the activated interface, the suspending confirmation message being generated by the gNB-CU 120-1 based on the interface suspending request.

In some example embodiments, the gNB-DU 110-1 may transmit the interface suspending request comprises transmitting at least one of the following: a message type associated with the interface suspending request; an identity of a transaction initiated by the interface suspending request; an identity of the gNB-DU 110-1, an indication of a time period for keeping configuration parameters of the activated interface by the gNB-CU 120-1 an indication for indicating whether a transport protocol being kept by the gNB-CU 120-1 after the activated interface being suspended; and an indication for indicating whether a security context being kept by the gNB-CU 120-1 after the activated interface being suspended.

Figure 8:
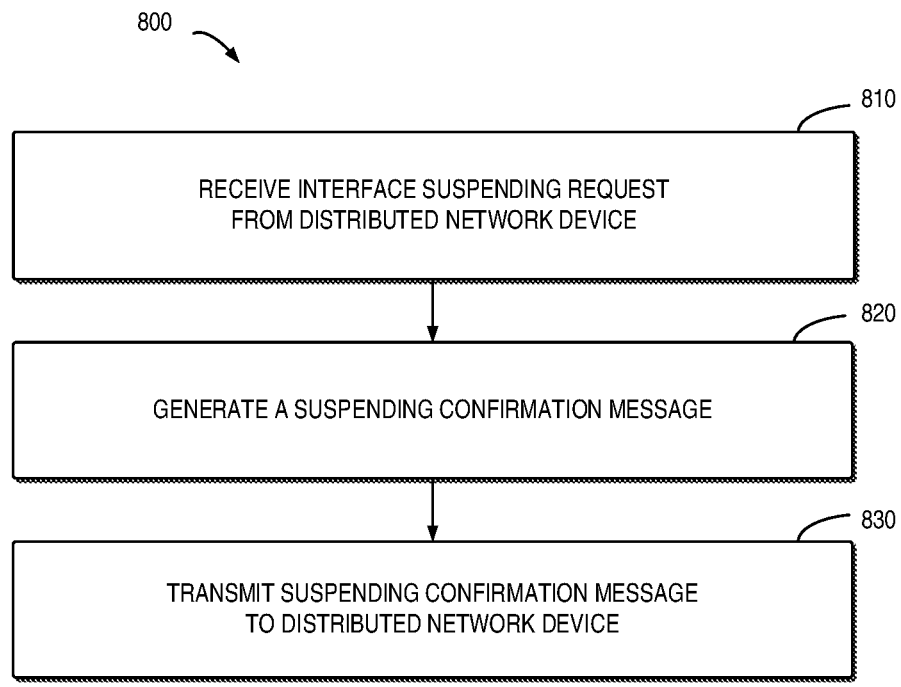
FIG. 8 shows a flowchart of an example method 800 for a centralized network device change procedure in non-terrestrial networks according to some embodiments of the present disclosure.

FIG. 8 shows a flowchart of an example method 800 for a centralized network device change procedure, for example, in non-terrestrial networks according to some embodiments of the present disclosure. The method 800 can be implemented at the gNB-CU 120-1 as shown in FIGS. 1-2. For the purpose of discussion, the method 800 will be described with reference to FIGS. 1-2.

At 810, if the gNB-DU 110-1 is to be disconnected with a gNB-CU 120-1 and a gNB-DU 110-2 is to be connected with gNB-CU 120-2 and an inactivated interface between the gNB-DU 110-2 and the gNB-CU 120-2 is successfully resumed, the gNB-CU 120-1 receives a suspending request message indicating the activated interface is ready to be suspended.

In some example embodiments, the gNB-CU 120-1 may receive the interface suspending request comprises transmitting at least one of the following: a message type associated with the interface suspending request; an identity of a transaction initiated by the interface suspending request; an identity of the gNB-DU 110-1, an indication of a time period for keeping configuration parameters of the activated interface by the gNB-CU 120-1 an indication for indicating whether a transport protocol being kept by the gNB-CU 120-1 after the activated interface being suspended; and an indication for indicating whether a security context being kept by the gNB-CU 120-1 after the activated interface being suspended.

At 820, the gNB-CU 120-1 generates, based on the interface suspending request, a suspending confirmation message indicating the activated interface is ready to be suspended.

At 830, the gNB-CU 120-1 transmits the suspending confirmation message to the gNB-DU 110.

Figure 9:
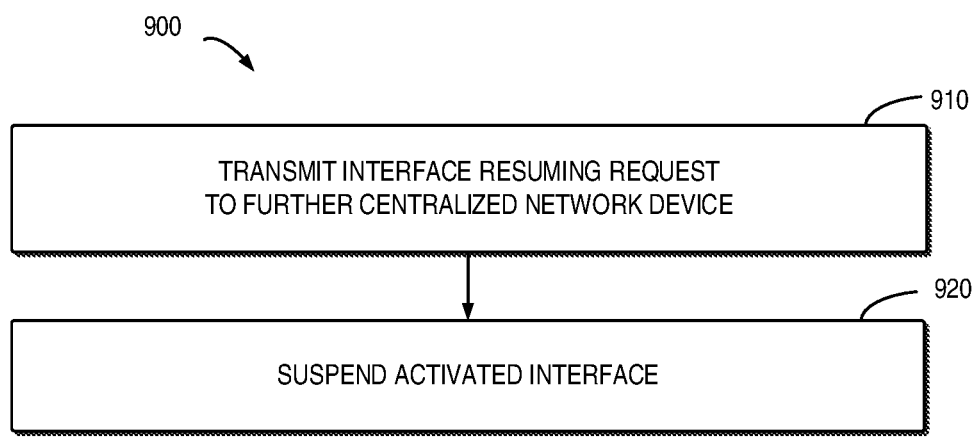
FIG. 9 shows a flowchart of an example method 900 for a centralized network device change procedure in non-terrestrial networks according to some embodiments of the present disclosure.

FIG. 9 shows a flowchart of an example method 900 for a centralized network device change procedure, for example, in non-terrestrial networks according to some embodiments of the present disclosure. The method 900 can be implemented at the gNB-DU 110-2 as shown in FIGS. 1-2. For the purpose of discussion, the method 900 will be described with reference to FIGS. 1-2.

At 910, if the gNB-DU 110-1 is to be disconnected with a gNB-CU 120-1 and a gNB-DU 110-2 is to be connected with gNB-CU 120-2, the gNB-DU 110-2 transmits an interface resuming request from the gNB-DU 110-2 to the gNB-CU 120-2, the interface resuming request being used for resuming an inactivated interface between the gNB-CU 120-2 and the gNB-DU 110-2. The terminal device 140 may be served by the gNB-CU 120-1 via the gNB-DU 110-1. The gNB-DU 110-2 may determine the need to initiate the interface resume procedure based on various criteria, for example, based on the configured time, or the location of the gNB-DU 110-2 (or satellite), the quality of the interface between the gNB-DU 110-2 and gNB-CU 120-2, etc.

In some example embodiments, the gNB-DU 110-2 may transmit the interface resuming request comprises transmitting at least one of the following: a message type associated with the interface resuming request; an identity of a transaction initiated by the interface resuming request; and an identity of the gNB-DU 110-2.

At 920, if the gNB-DU 110-2 receives, from the gNB-CU 120-2, a resuming status message indicating the interface is successfully resumed, the gNB-DU 110-2 activates the interface to complete the resume procedure, such that a terminal device 140 being handed over from gNB-CU 120-1 to a gNB-CU 120-2, the terminal device 140 is served by the gNB-CU 120-1 via the gNB-DU 110-1.

In some example embodiments, if the gNB-DU 110-2 receives, from the gNB-CU 120-2, a resuming status message indicating the interface is unsuccessfully resumed, the gNB-DU 110-2 may transmit the configuration parameters of the interface to the gNB-CU 120-2. If the gNB-DU 110-2 receives, from the gNB-CU 120-2, a configuration confirmation message indicating the configuration parameters is successfully received by the gNB-CU 120-2, the gNB-DU 110-2 activates the interface to complete the resume procedure.

Figure 10:
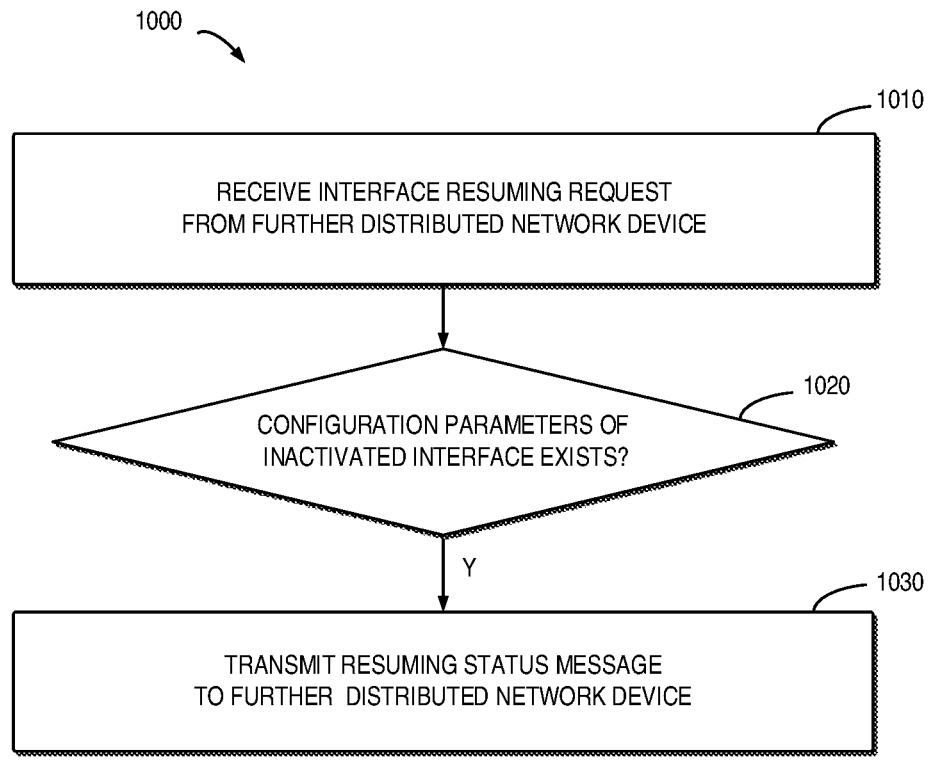
FIG. 10 shows a flowchart of an example method 1000 for a centralized network device change procedure in non-terrestrial networks according to some embodiments of the present disclosure.

FIG. 10 shows a flowchart of an example method 1000 for a centralized network device change procedure, for example, in non-terrestrial networks according to some embodiments of the present disclosure. The method 1000 can be implemented at the gNB-CU 120-2 as shown in FIGS. 1-2. For the purpose of discussion, the method 1000 will be described with reference to FIGS. 1-2.

At 1010, if the gNB-DU 110-1 is to be disconnected with a gNB-CU 120-1 and a gNB-DU 110-2 is to be connected with gNB-CU 120-2 and an inactivated interface between the gNB-DU 110-2 and the gNB-CU 120-2 is successfully resumed, the gNB-CU 120-2 receives an interface resuming request from the gNB-DU 110-2, the interface resuming request is used for resuming an inactivated interface between the gNB-CU 120-2 and the gNB-DU 110-2.

In some example embodiments, the gNB-CU 120-2 may receive the interface resuming request which comprises at least one of the following: a message type associated with the interface resuming request; an identity of a transaction initiated by the interface resuming request; and an identity of the gNB-DU 110-2.

At 1020, the gNB-CU 120-2 determines, based on the interface resuming request, whether the configuration parameters exist at the gNB-CU 120-2.

At 1030, if the gNB-CU 120-2 determines the configuration parameters exist at the gNB-CU 120-2, the gNB-CU 120-2 transmits a resuming status message indicating the interface is successfully resumed to the gNB-DU 110-2.

In some example embodiments, if the gNB-CU 120-2 determines the configuration parameters not exist at the gNB-CU 120-2, the gNB-CU 120-2 may transmit the resuming status message indicating the interface is unsuccessfully resumed to the gNB-DU 110-2. The gNB-CU 120-2 may receive the configuration parameters of the interface from the gNB-DU 110-2. The gNB-CU 120-2 may further generate a configuration confirmation message indicating the configuration parameters is successfully received by the gNB-CU 120-2 and transmit the configuration confirmation message to the gNB-DU 110-2.

In some example embodiments, an apparatus capable of performing the method 400 (for example, implemented at the gNB-DU 110-1) may comprise means for performing the respective steps of the method 400. The means may be implemented in any suitable form. For example, the means may be implemented in a circuitry or software module.

In some example embodiments, the apparatus capable of performing the method 400 comprises means for in response to a terminal device being to be handed over from a centralized network device to a further centralized network device, transmitting an interface resuming request from a distributed network device to the further centralized network device, the interface resuming request being used for resuming an inactivated interface between the further centralized network device and the distributed network device, the terminal device is served by the centralized network device via the distributed network device; and means for in response to receiving, from the further centralized network device, a resuming status message indicating the interface is successfully resumed, activating the inactivated interface to complete the resume procedure.

In some example embodiments, an apparatus capable of performing the method 500 (for example, implemented at the gNB-CU 120-2) may comprise means for performing the respective steps of the method 500. The means may be implemented in any suitable form. For example, the means may be implemented in a circuitry or software module.

In some example embodiments, the apparatus capable of performing the method 500 comprises means for means for receiving, at a further centralized network device, an interface resuming request from the distributed network device, the interface resuming request being used for resuming inactivated interface between the further centralized network device and the distributed network device and being transmitted by the distributed network device in response to a terminal device being to be handed over from a centralized network device to the further centralized network device, the terminal device is served by the centralized network device via the distributed network device; means for determining, based on the interface resuming request, whether configuration parameters of the inactivated interface exist at the further centralized network device; and means for in response to determining that the configuration parameters exist at the further centralized network device, transmitting, to the distributed network device, a resuming status message indicating the inactivated interface is successfully resumed.

In some example embodiments, an apparatus capable of performing the method 600 (for example, implemented at the gNB-CU 120-1) may comprise means for performing the respective steps of the method 600. The means may be implemented in any suitable form. For example, the means may be implemented in a circuitry or software module.

In some example embodiments, the apparatus capable of performing the method 600 comprises means for receiving, at a centralized network device, an interface suspending request from the distributed network device, the interface suspending request being used for suspending an activated interface between the distributed network device and the centralized network device; means for generating, based on the interface suspending request, a suspending confirmation message indicating the interface is ready to be suspended; and means for transmitting the suspending confirmation message to the distributed network device.

In some example embodiments, an apparatus capable of performing the method 700 (for example, implemented at the gNB-DU 110-11) may comprise means for performing the respective steps of the method 700. The means may be implemented in any suitable form. For example, the means may be implemented in a circuitry or software module.

In some example embodiments, the apparatus capable of performing the method 700 comprise means for in response to a terminal device being handed over from a centralized network device to a further centralized network device, transmitting an interface suspending request to the centralized network device from a distributed network device having an activated interface with the centralized network device, the interface suspending request being used for suspending the activated interface, the terminal device being served by the centralized network device via the distributed network device; and means for in response to receiving, from the centralized network device, a suspending confirmation message indicating the activated interface is ready to be suspended, suspending the activated interface, the suspending confirmation message being generated by the centralized network device based on the interface suspending request.

In some example embodiments, an apparatus capable of performing the method 800 (for example, implemented at the gNB-CU 120-1) may comprise means for performing the respective steps of the method 800. The means may be implemented in any suitable form. For example, the means may be implemented in a circuitry or software module.

In some example embodiments, the apparatus capable of performing the method 800 comprise means for receiving, at a centralized network device, an interface suspending request from a distributed network device having an activated interface with the centralized network device, the interface suspending request being used for suspending the activated interface and being transmitted by the distributed network device in response to a terminal device being handed over from a centralized network device to a further centralized network device, the terminal device being served by the centralized network device via the distributed network device; means for generating, based on the interface suspending request, a suspending confirmation message indicating the activated interface is ready to be suspended; and means for transmitting the suspending confirmation message to the distributed network device.

In some example embodiments, an apparatus capable of performing the method 900 (for example, implemented at the gNB-DU 110-2) may comprise means for performing the respective steps of the method 900. The means may be implemented in any suitable form. For example, the means may be implemented in a circuitry or software module.

In some example embodiments, the apparatus capable of performing the method 900 comprises means for transmitting an interface resuming request from a further distributed network device to a further centralized network device, the interface resuming request being used for resuming an inactivated interface between the further centralized network device and the further distributed network device; and means for in response to receiving, from the further centralized network device, a resuming status message indicating the inactivated interface is successfully resumed, activating the inactivated interface to complete the resume procedure, such that a terminal device being handed over from a centralized network device to a further centralized network device, the terminal device being served by the centralized network device via the distributed network device.

In some example embodiments, an apparatus capable of performing the method 1000 (for example, implemented at the gNB-CU 120-2) may comprise means for performing the respective steps of the method 1000. The means may be implemented in any suitable form. For example, the means may be implemented in a circuitry or software module.

In some example embodiments, the apparatus capable of performing the method 1000 comprises means for receiving, at a further centralized network device, an interface resuming request from a further distributed network device, the interface resuming request being used for resuming an inactivated interface between the further centralized network device and the further distributed network device; means for determining, based on the interface resuming request, whether configuration parameters of the inactivated interface exist at the centralized network device; and means for in response to determining that the configuration parameters exist at the centralized network device, transmitting, to the distributed network device, a resuming status message indicating the interface is successfully resumed.

Figure 11:
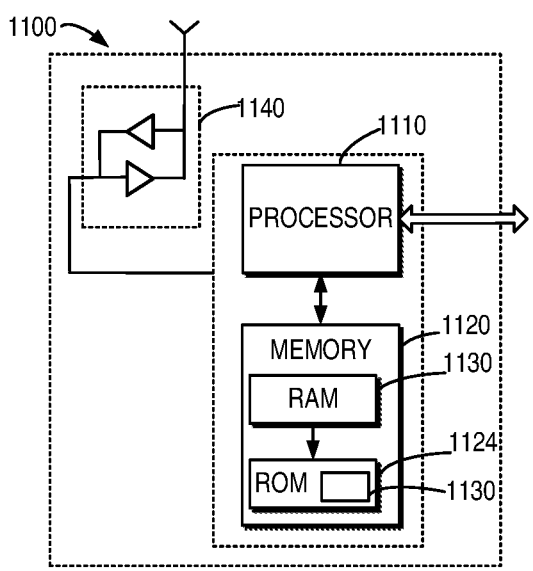
FIG. 11 is a simplified block diagram of a device that is suitable for implementing embodiments of the present disclosure.

FIG. 11 is a simplified block diagram of a device 1100 that is suitable for implementing embodiments of the present disclosure. The device 1100 may be provided to implement the gNB-DU 110-1 or 110-2 or the gNB-CU 120-1 or 120-2 as shown in FIG. 1. As shown, the device 1100 includes one or more processors 1110, one or more memories 1120 coupled to the processor 1110, and one or more transmitters and/or receivers (TX/RX) 1140 coupled to the processor 1110.

The TX/RX 1140 is for bidirectional communications. The TX/RX 1140 has at least one antenna to facilitate communication. The communication interface may represent any interface that is necessary for communication with other network elements.

The processor 1110 may be of any type suitable to the local technical network and may include one or more of the following: general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

The memory 1120 may include one or more non-volatile memories and one or more volatile memories. Examples of the non-volatile memories include, but are not limited to, a Read Only Memory (ROM) 1124, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1122 and other volatile memories that will not last in the power-down duration.

A computer program 1130 includes computer executable instructions that are executed by the associated processor 1110. The program 1130 may be stored in the ROM 1124. The processor 1110 may perform any suitable actions and processing by loading the program 1130 into the RAM 1122.

The example embodiments of the present disclosure may be implemented by means of the program 1130 so that the device 1100 may perform any process of the disclosure as discussed with reference to FIGS. 2 to 10. The embodiments of the present disclosure may also be implemented by hardware or by a combination of software and hardware.

Figure 12:
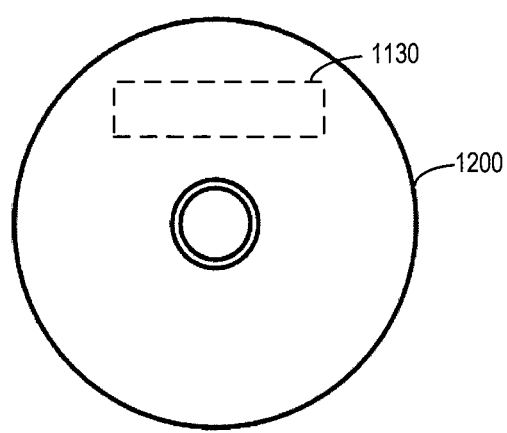
FIG. 12 illustrates a diagram of an example computer readable medium in accordance with some embodiments of the present disclosure.

In some example embodiments, the program 1130 may be tangibly contained in a computer readable medium which may be included in the device 1100 (such as in the memory 1120) or other storage devices that are accessible by the device 1100. The device 1100 may load the program 1130 from the computer readable medium to the RAM 1122 for execution. The computer readable medium may include any types of tangible non-volatile storage, such as ROM, EPROM, a flash memory, a hard disk, CD, DVD, and the like. FIG. 12 shows an example of the computer readable medium 1200 in form of CD or DVD. The computer readable medium has the program 1130 stored thereon.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. For example, in some embodiments, various examples of the present disclosure (e.g., a method, apparatus or device) may be partly or fully implemented on the computer readable medium. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The units included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

As examples, embodiments of the present disclosure may be described in the context of the computer-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, a computer readable medium may be any tangible medium that may contain, or store a program for use by or in connection with an instruction execution system, apparatus, or device. The computer readable medium may be a machine readable signal medium or a machine readable storage medium. The computer readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain cases, multitasking and parallel processing may be advantageous. Likewise, while several specific example embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it would be appreciated that the present disclosure defined in the appended claims is not necessarily limited to the specific features or acts described above. Rather, the specific features and acts described above are disclosed as example forms of implementing the claims.

What is claimed is:

1. An apparatus comprising:
   at least one processor; and
   at least one memory including computer program code;
   the at least one memory and the computer program code configured to, with the at least one processor, cause the apparatus at least to perform:
   in response to a distributed network device being to be disconnected with a centralized network device and connected with a further centralized network device, transmitting an interface resuming request from the distributed network device to the further centralized network device, the interface resuming request being used for resuming an inactivated interface between the further centralized network device and the distributed network device;
   in response to receiving, from the further centralized network device, a resuming status message indicating the interface is successfully resumed, activating the inactivated interface to complete the resume procedure;
   transmitting an interface suspending request from the distributed network device to the centralized network device, the interface suspending request being used for suspending an activated interface between the distributed network device and the centralized network device; and
   in response to receiving, from the centralized network device, a suspending confirmation message indicating the activated interface is ready to be suspended, suspending the further interface, the suspending confirmation message being generated by the centralized network device based on the interface suspending request,
   wherein the at least one memory and the computer program code configured to, with the at least one processor, cause the apparatus at least to transmit:
   a message type associated with the interface suspending request;
   an identity of a transaction initiated by the interface suspending request;
   an identity of the distributed network device;
   an indication of a time period for keeping configuration parameters of the activated interface by the centralized network device;
   an indication for indicating whether a transport protocol being kept by the centralized network device after the activated interface being suspended; and
   an indication for indicating whether a security context being kept by the centralized network device after the activated interface being suspended.

2. The apparatus of claim 1, wherein the interface resuming request comprises at least one of the following:
   a message type associated with the interface resuming request;
   an identity of a transaction initiated by the interface resuming request; and
   an identity of the distributed network device.

3. The apparatus of claim 1, wherein the at least one memory and the computer program code are configured to, with the at least one processor, cause the apparatus at least to perform:
   in response to receiving, from the further centralized network device, the resuming status message indicating the interface is unsuccessfully resumed, transmitting configuration parameters of the inactivated interface to the further centralized network device; and
   in response to receiving, from the further centralized network device, a configuration confirmation message indicating the configuration parameters are successfully received by the further centralized network device, activating the inactivated interface to complete the resume procedure.

4. The apparatus of claim 1, wherein the at least one memory and the computer program code are configured to, with the at least one processor, cause the apparatus at least to perform:
   in response to a distributed network device being to be disconnected with a centralized network device and connected with a further centralized network device, receiving, at the further centralized network device, an interface resuming request from the distributed network device, the interface resuming request being used for resuming inactivated interface between the further centralized network device and the distributed network device;
   determining, based on the interface resuming request, whether configuration parameters of the inactivated interface exist at the further centralized network device; and
   in response to determining that the configuration parameters exist at the further centralized network device, transmitting, to the distributed network device, a resuming status message indicating the inactivated interface is successfully resumed.

5. The apparatus of claim 4, wherein the interface resuming request comprises at least one of the following:
   a message type associated with the interface resuming request;
   an identity of a transaction initiated by the interface resuming request; and
   an identity of the distributed network device.

6. The apparatus of claim 4, wherein the at least one memory and the computer program code are configured to, with the at least one processor, cause the apparatus at least to perform:
   in response to determining that the configuration parameters not exist at the further centralized network device, transmitting, to the distributed network device, the resuming status message indicating the inactivated interface is unsuccessfully resumed;

receiving the configuration parameters of the inactivated interface from the distributed network device;

generating a configuration confirmation message indicating the configuration parameters is successfully received by the further centralized network device; and transmitting the configuration confirmation message to the distributed network device.

7. The apparatus of claim 1, wherein the at least one memory and the computer program code are configured to, with the at least one processor, cause the apparatus at least to perform:

in response to a distributed network device being to be disconnected with a centralized network device and connected with a further centralized network device and an inactivated interface between the further centralized network device and the distributed network device being to be resumed, receiving, at the centralized network device, an interface suspending request from the distributed network device, the interface suspending request being used for suspending an activated interface between the distributed network device and the centralized network device;

generating, based on the interface suspending request, a suspending confirmation message indicating the interface is ready to be suspended; and transmitting the suspending confirmation message to the distributed network device.

8. The apparatus of claim 7, wherein the interface suspending request comprises at least one of the following:

a message type associated with the interface suspending request;

an identity of a transaction initiated by the interface suspending request;

an identity of the distributed network device;

an indication of a time period for keeping configuration parameters of the activated interface by the centralized network device;

an indication for indicating whether a transport protocol being kept by the centralized network device after the activated interface being suspended; and an indication for indicating whether a security context being kept by the centralized network device after the activated interface being suspended.

9. A method comprising:

in response to a distributed network device being to be disconnected with a centralized network device and connected with a further centralized network device, transmitting an interface resuming request from the distributed network device to the further centralized network device, the interface resuming request being used for resuming an inactivated interface between the further centralized network device and the distributed network device;

in response to receiving, from the further centralized network device, a resuming status message indicating the interface is successfully resumed, activate the inactivated interface to complete the resume procedure;

transmitting an interface suspending request from the distributed network device to the centralized network device, the interface suspending request being used for suspending an activated interface between the distributed network device and the centralized network device; and in response to receiving, from the centralized network device, a suspending confirmation message indicating the activated interface is ready to be suspended, suspending the further interface, the suspending confirmation message being generated by the centralized network device based on the interface suspending request, wherein the distributed network device is configured to at least transmit:

a message type associated with the interface suspending request;

an identity of a transaction initiated by the interface suspending request;

an identity of the distributed network device;

an indication of a time period for keeping configuration parameters of the activated interface by the centralized network device, an indication for indicating whether a transport protocol being kept by the centralized network device after the activated interface being suspended; and an indication for indicating whether a security context being kept by the centralized network device after the activated interface being suspended.

10. The method of claim 9, wherein the interface resuming request comprises at least one of the following:

a message type associated with the interface resuming request;

an identity of a transaction initiated by the interface resuming request; and an identity of the distributed network device.

11. The method of claim 9 comprising:

in response to receiving, from the further centralized network device, the resuming status message indicating the interface is unsuccessfully resumed, transmitting configuration parameters of the inactivated interface to the further centralized network device; and in response to receiving, from the further centralized network device, a configuration confirmation message indicating the configuration parameters are successfully received by the further centralized network device, activating the inactivated interface to complete the resume procedure.

12. The method of claim 9, wherein comprising:

in response to a distributed network device being to be disconnected with a centralized network device and connected with a further centralized network device, receiving, at the further centralized network device, an interface resuming request from the distributed network device, the interface resuming request being used for resuming inactivated interface between the further centralized network device and the distributed network device;

determining, based on the interface resuming request, whether configuration parameters of the inactivated interface exist at the further centralized network device; and in response to determining that the configuration parameters exist at the further centralized network device, transmitting, to the distributed network device, a resuming status message indicating the inactivated interface is successfully resumed.

13. The method of claim 12, wherein the interface resuming request comprises at least one of the following:

a message type associated with the interface resuming request;

an identity of a transaction initiated by the interface resuming request; and an identity of the distributed network device.

14. The method of claim 12, further comprising:

in response to determining that the configuration parameters not exist at the further centralized network device, transmitting, to the distributed network device, the resuming status message indicating the inactivated interface is unsuccessfully resumed;

receiving the configuration parameters of the inactivated interface from the distributed network device;

generating a configuration confirmation message indicating the configuration parameters is successfully received by the further centralized network device; and transmitting the configuration confirmation message to the distributed network device.

15. The method of claim 9 further comprising:

in response to a distributed network device being to be disconnected with a centralized network device and connected with a further centralized network device and an inactivated interface between the further centralized network device and the distributed network device being to be resumed, receiving, at the centralized network device, an interface suspending request from the distributed network device, the interface suspending request being used for suspending an activated interface between the distributed network device and the centralized network device;

generating, based on the interface suspending request, a suspending confirmation message indicating the interface is ready to be suspended; and transmitting the suspending confirmation message to the distributed network device.

16. The method of claim 15, wherein the interface suspending request comprises at least one of the following:

message type associated with the interface suspending request;

an identity of a transaction initiated by the interface suspending request;

an identity of the distributed network device;

an indication of a time period for keeping configuration parameters of the activated interface by the centralized network device;

an indication for indicating whether a transport protocol being kept by the centralized network device after the activated interface being suspended; and an indication for indicating whether a security context being kept by the centralized network device after the activated interface being suspended.

* * * * *